United States Patent [19]
Skarie et al.

[11] Patent Number: 6,115,115
[45] Date of Patent: Sep. 5, 2000

[54] VOLUME SENSOR FOR PADDLE ELEVATOR USING LASER LIGHT

[75] Inventors: Christopher Jason Skarie, Audubon, Minn.; Philip Alan Harden, Colona, Ill.; Ahmad Mahin-Fallah, Fargo, N. Dak.

[73] Assignee: Deere & Company, Moline, Ill.

[21] Appl. No.: 09/102,928

[22] Filed: Jun. 23, 1998

[51] Int. Cl.[7] ............................. G01N 21/00; G01N 9/04
[52] U.S. Cl. .................... 356/73; 356/436; 250/223 R
[58] Field of Search .................................. 356/379, 436, 356/73; 250/223 R

[56] References Cited

U.S. PATENT DOCUMENTS

| | | | |
|---|---|---|---|
| 4,441,513 | 4/1984 | Herwig | 130/27 B |
| 5,751,421 | 5/1998 | Wright et al. | 356/328 |

FOREIGN PATENT DOCUMENTS 24 45 046  4/1976  Germany.

*Primary Examiner*—Frank G. Font
*Assistant Examiner*—Michael P. Stafira

[57] ABSTRACT

A laser sensor for detecting the volume of particulate material being conveyed by a paddle conveyor. The sensor comprises two opposed units, a master unit and a slave unit. Each unit is provided with a single laser emitting diode and four photo detectors. The master unit is provided with a microprocessor for providing a square wave laser firing signal to the lasers. The slave unit is provided with an inverter for inverting the laser firing signal from the microprocessor. The lasers are fired sequentially when they receive a high pulse from the square wave emitted from the microprocessor. The photo detectors transmit their laser light detection signal when they receive a low pulse from the microprocessor which indicates the opposed laser has fired.

13 Claims, 4 Drawing Sheets

VOLUME SENSOR FOR PADDLE ELEVATOR USING LASER LIGHT

BACKGROUND OF THE INVENTION

1. Field of the Invention

The invention is directed to a laser volume sensor used on a combine for either detecting the amount of tailings being transported by the tailings elevator, or the amount of clean grain being transported by the clean grain elevator.

2. Description of the Prior Art

Combines are large agricultural machines used to harvest a crop from a field. After the crop is harvested by a harvesting platform, the crop material is transported by a feederhouse into the interior of the combine. A threshing assembly threshes the harvested crop material breaking the grain apart from other grain and/or a husk. Next a separator assembly separates the clean grain the crop material other than grain. The crop material other than grain is returned to the field, while the grain and entrained small particles, chaff, are directed to a cleaning system. The cleaning system cleans the grain removing the chaff by blowing the chaff out the rear of the combine. The clean grain is transported by a clean grain elevator to a grain tank located on the combine. Photoelectric sensors for measuring the volume of clean grain passing through the clean grain elevator have been proposed, see German patent 2,445,046.

Sometimes clean grain, unthreshed heads of grain and other crop material pass over the sieves of the cleaning system and become tailings. These tailings are caught before being expelled from the combine. The tailings are returned to the threshing assembly by a tailings elevator. Photodiode sensors for measuring the volume of tailings passing through the tailings elevator have also been proposed, see U.S. Pat. No. 4,441,513.

SUMMARY

It is an object of the present invention to provide a laser based sensor for detecting the volume of material being conveyed by a paddle conveyor.

It is a feature of the presently invention that the sensor comprises an master unit and an opposed slave unit with each unit having a laser and each unit having at least two photo detectors. The opposed photo detectors are only triggered when the opposed laser is fired.

In the preferred embodiment of the sensor, the master and slave units are substantially identical. In each unit the photo detectors and laser are arranged in a line with the laser being located at the highest position in the line. Each photo detector is provided with a photo detector circuit that transmits the laser light detection signal only when the opposed laser is fired. In this way, laser light detected from the laser located in the same unit is not transmitted to the microprocessor.

The master unit is provided with a microprocessor which controls the operation of the sensor. More specifically, the microprocessor sends out a square wave of high-low pulses. The laser is fired on the high pulses and the photo detectors are triggered on the low pulses. Therefore when the master unit's laser is fired by a high pulse, the master unit's photo detectors are not triggered as they have also received a high pulse.

The slave unit is electrically coupled to the master unit and is provided with an inverter that inverts the high-low pulses from the microprocessor. The inverter essentially changes the high pulse from the microprocessor to a low pulse and the low pulse to a high pulse. In this way when the microprocessor has issued a high pulse, the master unit's laser is fired and the opposed slave unit's photo detectors are triggered as the high pulse has been inverted into a low pulse. Similarly, when the microprocessor issues a low pulse, the master unit's photo detectors are triggered and the opposed slave unit's laser is fired as the low pulse has been inverted into a high pulse. It has been found that a microprocessor emitting a 400 hertz square wave works well in providing the high-low pulses.

Both the master and slave units are provided with a protective lens of ultra high molecular weight polyethylene. This lens extends into the elevator and is cleaned by the particulate material passing by the lens.

DETAILED DESCRIPTION

Figure 1:
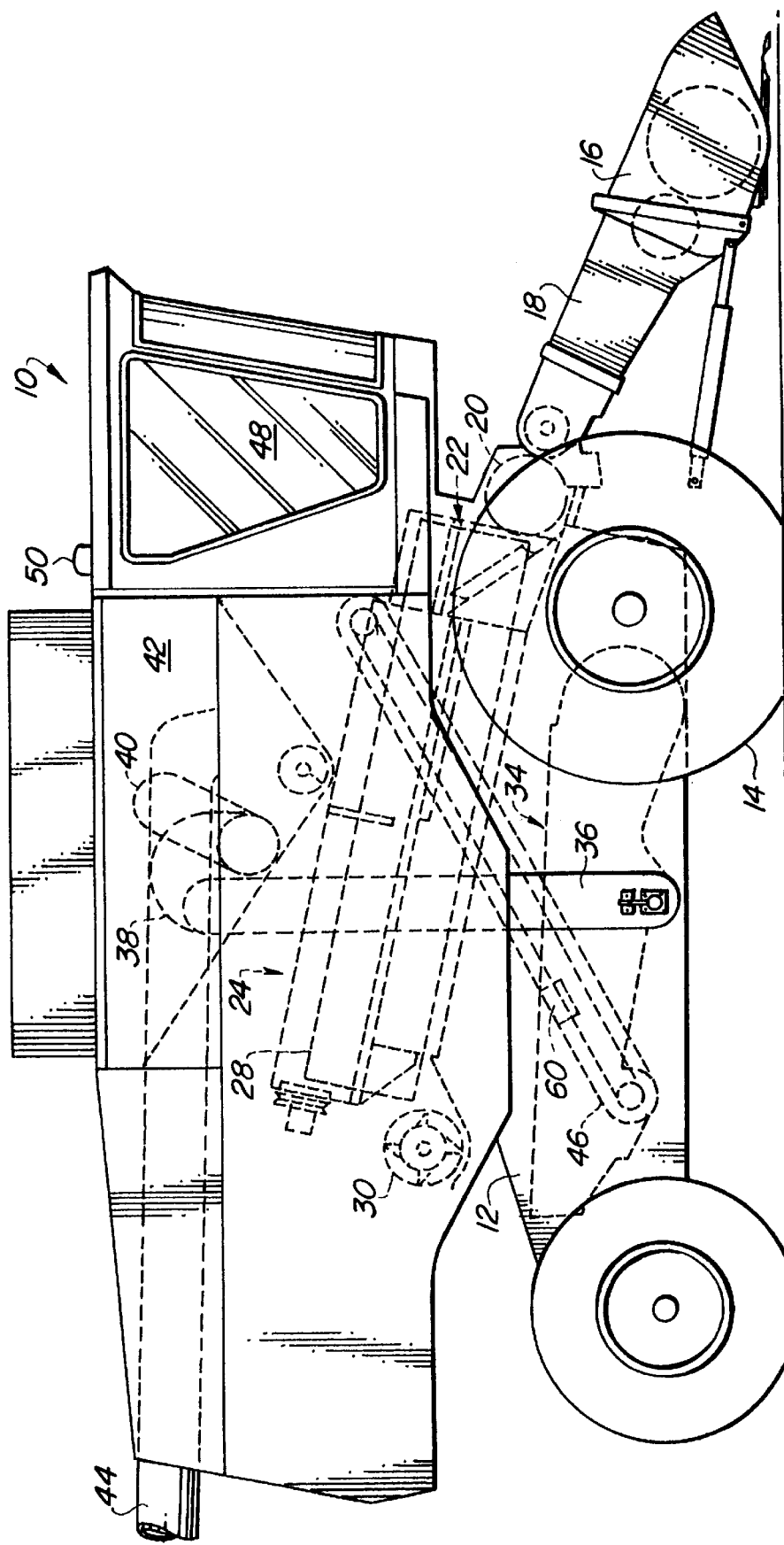
FIG. 1 is the right-hand semi-schematic view of an agricultural combine.

FIG. 1 shows an agricultural combine 10 comprising a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24. The axial crop processing unit is located between the sidesheets of the combine. The sidesheets form part of the supporting structure. Although the invention is being described as being mounted on a rotary combine, it may also be used on other combines having a clean grain elevator and/or a tailings elevator, such as conventional straw walker machines.

The axial crop processing unit 24 comprises an axial rotor housing 26 and an axial rotor 28 located in the housing. The harvested crop enters the housing through the inlet transition section 22. The rotor is provided with an infeed portion, a threshing portion and a separating portion. The rotor housing has a corresponding infeed section, a threshing section and a separating section.

Both crop processing portions of the rotor 28, the threshing portion and the separating portion, are provided with crop engaging assemblies. The threshing section of the rotor housing is provided with a concave and the separating section is provided with a grate. Grain, including unthreshed heads of grain, chaff and other crop material are released from the crop mat and fall through the concave and the grate to the cleaning system. Larger crop material is expelled out the rear of the axial crop processing unit by beater 30.

Figure 2:
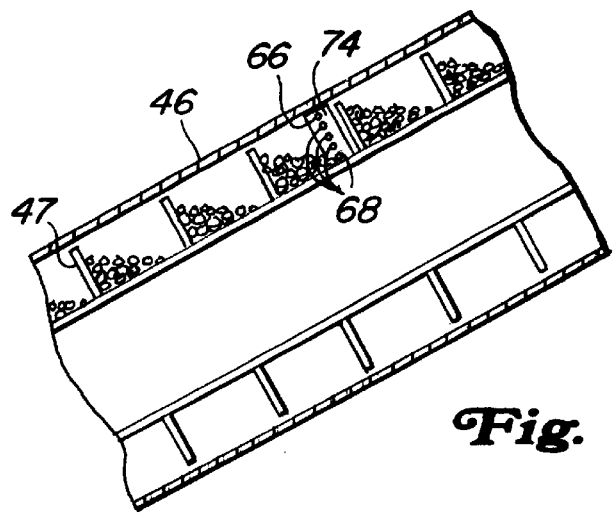
FIG. 2 is a partial cross sectional side view of the sensor and its location in a portion of the tailings elevator.

As illustrated in FIG. 1, grain and chaff falling through the concave and grate is directed to cleaning system 34 which removes the chaff from the grain. The cleaning system is provided with a blower that blows chaff out the rear of the combine. The heavier clean grain is collected by a transverse clean grain auger which directs the clean grain to a clean grain paddle elevator 36. The paddle elevator 36 directs the grain upwardly to a transition housing 38 where the grain is supplied to a loading auger 40 for loading the clean grain tank 42. The grain is removed from the clean grain tank 42 by unloading auger 44. Similarly, clean grain not falling through the sieves, unthreshed heads of grain and other crop material form tailings that are collected by a tailings cross auger which directs the tailings to a tailing paddle elevator 46. As best illustrated in FIG. 2, the tailing paddle elevator is provided with a series of chain driven paddles 47 on which the tailings are transported. The tailing paddle elevator 46 directs the tailings to a tailings cross auger located adjacent to the threshing portion of the axial separator for injecting the tailings back into the crop processing unit. The operation of the combine is controlled from operator's cab 48. A radio receiver 50 for receiving GPS signals is positioned over the operator's cab so that the sensor data from the sensor can be combined with the GPS signal data to provide a crop mapping option.

The following description of the preferred embodiments directed to a volume sensor located in the tailings elevator of the combine. However it should be noted, that the sensor could also be located in the clean grain elevator. The sensor uses laser light to sense the crop material piled on the individual paddles as they pass the sensor's location. The sensor of the present invention could be used for measuring the volumetric flow rate (VFR) of any type of granular or particulate matter as it passes is conveyed by a paddle conveyor.

It is advantageous to the farmer or combine operator to have an indication of the amount of tailings and/or clean grain that is being conveyed by the elevator systems of the combine so as to avoid jamming and to assist in maintaining proper combine adjustments. Further, it is beneficial to have a volumetric measurement (as opposed to another measurement, such as mass), since crop yield is measured in bushels, which is a volumetric measurement.

The volume sensor 60 is mounted to the tailings elevator comprises two units, a master unit 62 and a slave unit 64. These units are mounted on either side of the enclosure of the tailings elevator 46 and are substantially parallel to and opposed to each other. Each unit is provided with a laser light emitting diode 66 (e.g., but not limited to, EG&G Optoelectronics C86137E or Siemens type SPL PL85) and four light emitting diodes forming photo detectors 68. The laser diode 66 and the photo detectors 68 are arranged in a line parallel to the elevator paddles. The laser diode 66 being the highest and the four photo detectors 68 extending downwardly therefrom. By having the laser diodes located at the highest point and opposed to one another the transverse slope of the tailings pile on the paddle can be sensed. By knowing the side profile of the material, the width of the elevator enclosure, and the time and distance between each paddle the volumetric flow rate of the tailings material can be predicted.

The sensor 60 is housed in a box 70 having an open side. The open side of the box is the surface that abuts the outside enclosure of the tailings elevator. A portion of the open side is provided with a faceplate 72 with the remaining portion of the circuit board is potted sealing the box 70. The face plate 72 is formed from an ultra-high molecular weight polyethylene (UHMWP), which is designed for high wearability and abrasion resistance. The selected UHMWP also has the appropriate optical properties, i.e., it is diffusing and the index of refraction =1.54 (unitless). The laser diode 66 and the photo detectors 68 are positioned as close to or in direct contact with the rear of the faceplate 72 facing outwardly therefrom. The faceplate forming a protective lens for the laser diode and the photo detectors. It has been found that the thickness of the faceplate 72 may effect the output of the laser diode 66 as detected by the opposed photo detectors 68. It has been found that a faceplate of 2.0 millimeters thickness works satisfactory.

The face plate is formed with a raised boss 74 forming the protective lens for the laser diode 66 and the photo detectors 68. The box 70 is mounted onto the exterior surface of the tailings elevator 46 by mounting bolts 73, in such a manner that the raised boss 74 fits through a cutout in the tailings elevator. The tailings elevator 46 being large enough to accommodate the size and shape of the raised boss 74. The raised boss 74 is designed such that it is thicker than the sheet metal comprising the tailings elevator enclosure (e.g., twice as thick as the sheet metal). This design allows increased exposure of the face of the raised boss to the tailings material, which acts as a self cleaning mechanism for the sensor face. The raised boss 74 is provided with tapered edges 76 in order to prevent a sharp edge inside the elevator 46.

Each of the laser diodes 66 emits a pulsed infrared or near-infrared light (e.g., 905 nm). The laser diodes 66 are pulsed incrementally at a predefined frequency of 400 hertz. When the laser diodes 66 are pulsed, the emitted light is coherent, with a gaussian spatial distribution. The light illuminates the entire inner chamber of the unblocked tailings elevator between the firing laser and the opposed triggered photo detectors.

Figure 4:
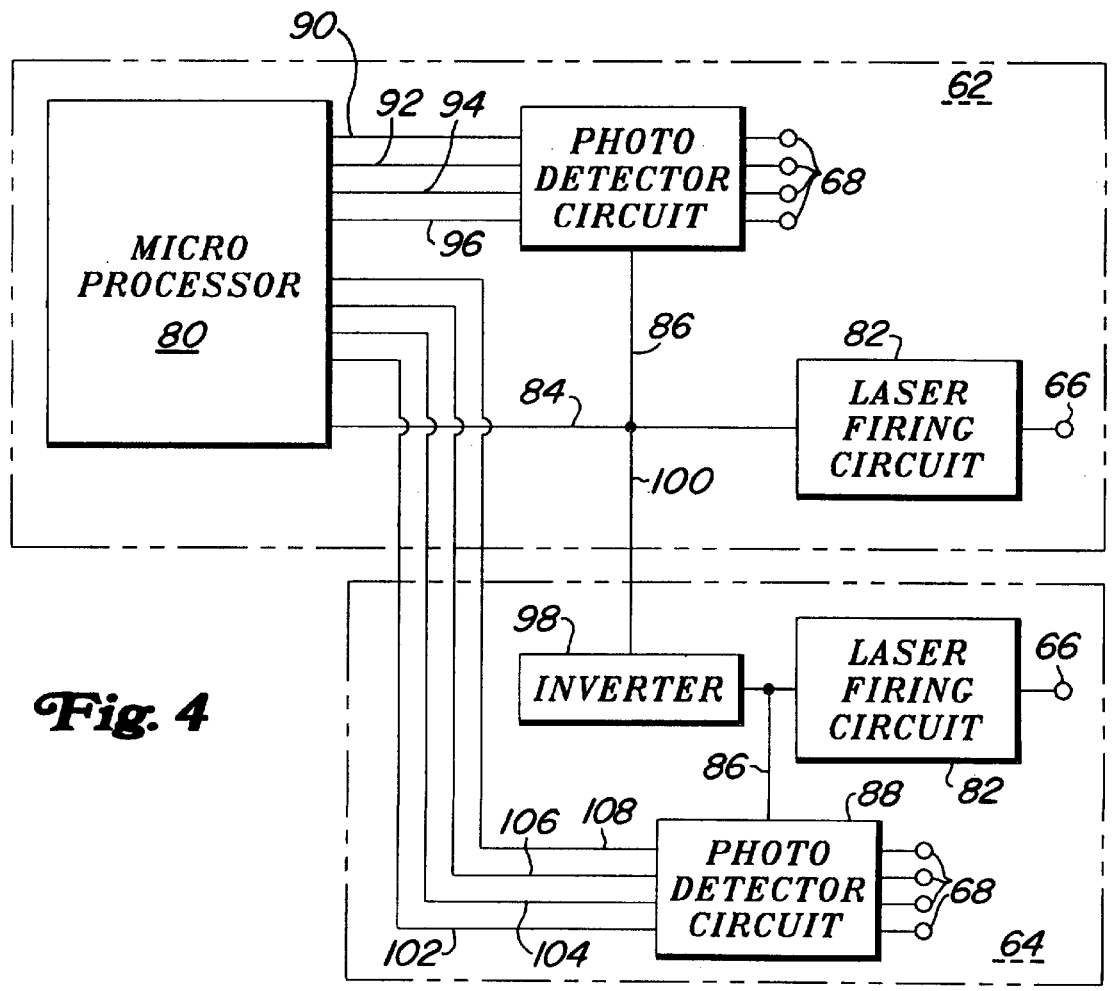
FIG. 4 is an electronic block diagram of the sensor.
Figure 3:
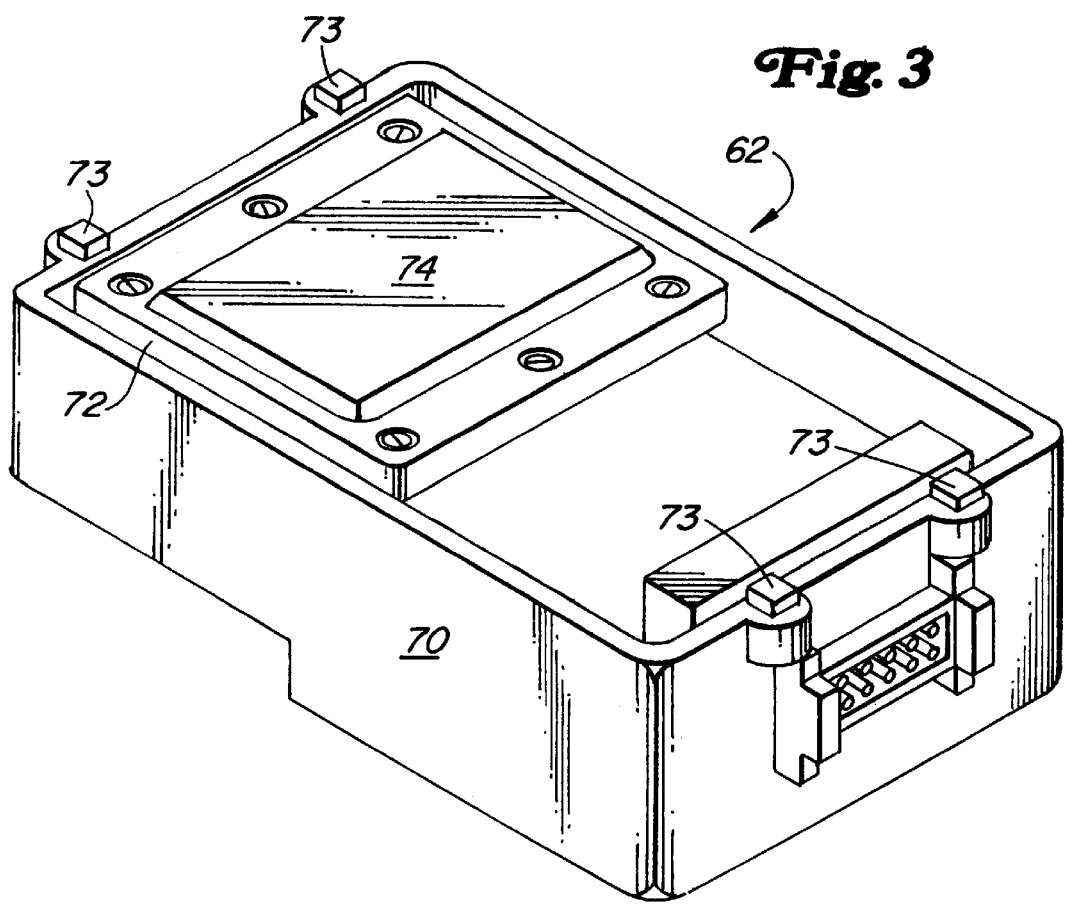
FIG. 3 is a perspective view of the master unit of the sensor.

FIG. 4 is a block diagram of the volume sensor electronics. The master unit is provided with a microprocessor 80 which is powered by a conventional power supply. The microprocessor is programmed to emit a 400 hertz high-low square wave pulse to the master unit's laser firing circuit 82 through line 84. Line 86 taps into line 84 and couples the master unit's photo detector circuit 88 the 400 hertz output of the microprocessor. As discussed above when the laser firing circuit 82 receives a high pulse the laser is fired. When photo detector circuit 88 receives a high pulse the photo detector circuit 88 is not triggered and no output is received from the master unit's photo detector circuit. Similarly, if a low pulse is received by the laser firing circuit 82, the laser is not fired. The low pulse triggers the photo detector circuit 88 detecting light emitted from the slave unit's laser, if not blocked by tailings, and sending that information back to the microprocessor via lines 90, 92, 94 and 96.

The slave unit is provided with an inverter 98 that inverts the 400 hertz high-low square wave received on line 100 making high pulses low pulses and low pulses high pulses. As with the master unit the laser firing circuit 82 of the slave unit is fired by high pulses and the photo detector circuit 88 is triggered by low pulses. As these pulses are inverted by the inverter 98, a high pulses from microprocessor 80, fires the master unit's laser firing circuit 82 and triggers the slave unit's photo detector circuit 88. The detected information by the slave unit's photo detectors 68 is transmitted back to the microprocessor 80 along lines 102,104,106, and 108. A low pulse from the microprocessor triggers the master unit photo detector circuit 88 and fires the slave unit's laser firing circuit 82.

The laser firing circuits for the master unit and the slave unit are of a conventional configuration. The photo detector circuits for the master and slave units are substantially identical with the photo detector circuit for one of the photo detectors being illustrated in FIG. 5. Each photo detector is provided with an photo amplifier 110 amplifying the resulting signal from the photo detector, a second stage amplifier 112 further amplifying the signal, an analog to digital converter 114 for converting the analog signal to a digital signal, and a logic circuit 116 for directing the digitized output signal to the microprocessor when the logic circuit receives a low pulse.

The photo diode LED1 produces a negative current pulse when it detects light. This signal is amplified by photo amplifier 110 with a gain of 100 resulting in a positive voltage pulse. This positive voltage pulse is amplified by second stage amplifier 112 with a gain of 100 into a negative voltage pulse that is directed to analog to digital converter 114. The digitized signal is directed to the logic circuit 116 where it is inverted by inverter U4 and applied to flip flop U5. Flip flop U5 signals the microprocessor via an appropriate line (90, 92, 94, 96, 102, 104, 106 or 108) as to the presence of laser light detected by the photo diode LED 1 when the flip flop receives a low pulse via line 86 directly from the microprocessor 80 for the master unit or from the inverter 98 for the slave unit.

The components of a single photo detector channel are listed in Table 1 and are disclosed as an example of a suitable circuit for the present application

TABLE 1

| | |
|---|---|
| C1, C4 | 0.1 micro farad 50 Volt Package Style 08 capacitor |
| C2 | 1000 pico farad 50 volt package style 08 capacitor |
| C3 | 5 pico farad 50 volt package style 08 capacitor |
| C5 | 15 pico farad 50 volt package style 08 capacitor |
| R1 | 4.99K ohms 1/10 watt 1% resistor |
| R2, R8 | 30.1K ohms 1/10 watt 1% resistor |
| R3, R5, R9 | 100K ohms 1/10 watt 1% resistor |
| R4, R6 | 1.0K ohms 1/10 watt 1% resistor |
| R7 | 243K ohms 1/10 watt 1% resistor |
| R10 | 10K ohms 1/10 watt 1% resistor |
| U1, U2 | 1/4 operational amplifier Motorola MC33074D |
| U3 | 1/4 operational amplifier National LM2901 |
| U4 | 1/4 Hex inverter Motorola MX74HC14 |
| U5 | 1/2 Dual D Flip Flop with set/reset MC74HC74AD |

Figure 5:
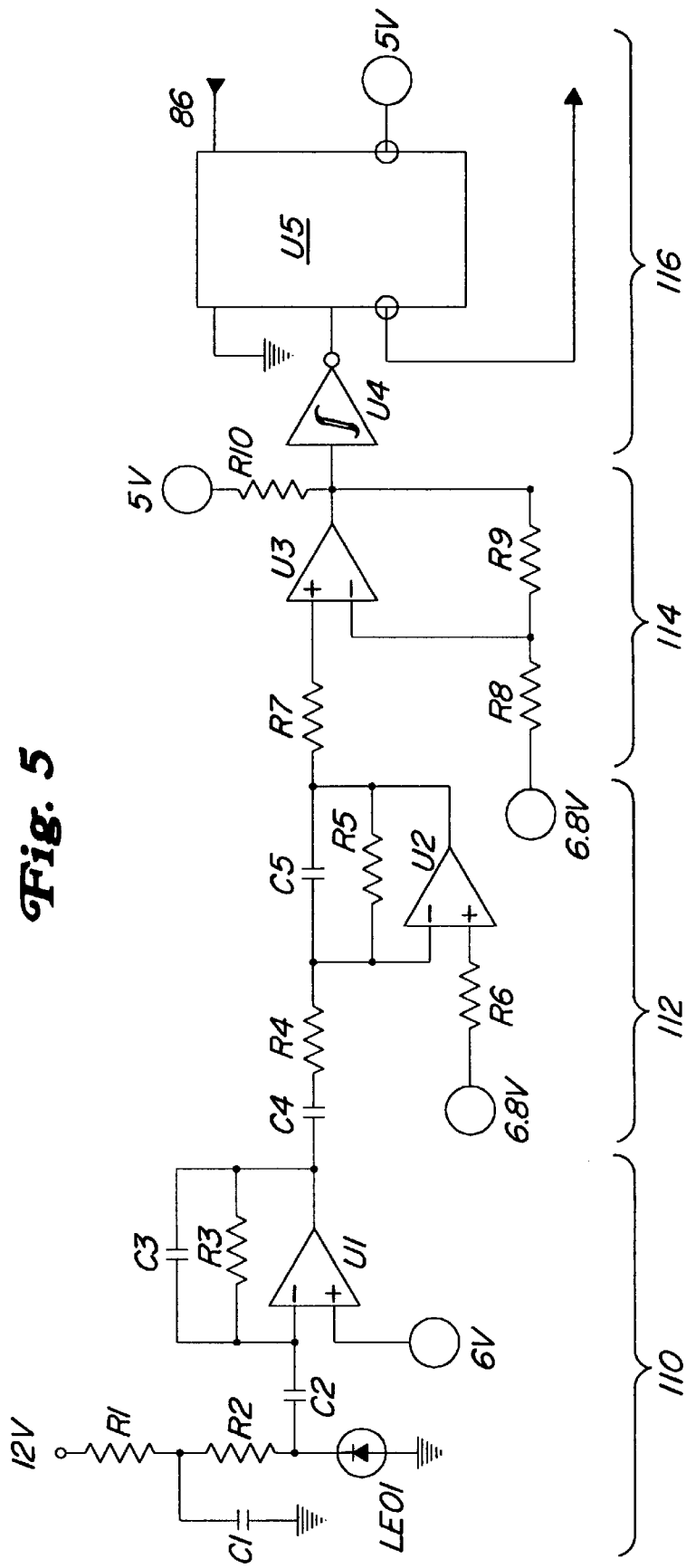
FIG. 5 is an electric schematic of the photo detector circuit.

It should again be noted that FIG. 5 represents one photo detector channel for one photo detector. The operational amplifiers U1, U2, U3 and the inverter U4 are shared among the other photo detectors in the photo detectors respective master or slave unit. Similarly half the dual flip flop is shared by the adjoining photo detector and another flip flop is provided for the two remaining photo detectors in the respective master or slave unit.

The present invention should not be limited to the above described embodiments but should be limited solely to the claims that follow.

We claim:

1. An agricultural combine for harvesting, threshing separating and cleaning a crop, the combine comprising:
   a paddle elevator having an enclosure through which particulate material is conveyed in the combine by a series of paddles;
   a volumetric sensor using laser light to sense the volume of particulate material being conveyed on the paddle conveyor, the volumetric sensor having at least two units located on opposed sides of the enclosure, each unit is provided with one laser and at least two photo detectors for detecting the laser light emitted and emitting a detection signal from the opposed laser indicating if the photo detector has detected laser light from the opposed laser.

2. An agricultural combine as defined by claim 1 wherein the lasers are located above the photo detectors.

3. An agricultural combine as defined by claim 2 wherein the laser and the photo detectors are arranged in a line.

4. An agricultural combine as defined by claim 3 wherein each unit is provided with four photo detectors and a single laser.

5. An agricultural combine as defined by claim 2 wherein the lasers are fired sequentially and the photo detectors are provided with a circuit that inhibits the detection signal from the photo detectors unless the opposed laser is fired.

6. An agricultural combine as defined by claim 5 wherein the opposed lasers are provided with a circuit for firing the lasers sequentially.

7. An agricultural combine as defined by claim 6 wherein one of the units is a master unit and is provided with a microprocessor for controlling the firing of the lasers and receiving the detection signals and the opposed unit is a slave unit that is electrically coupled to the master unit.

8. An agricultural combine as defined by claim 7 wherein the microprocessor provides a square wave signal to the lasers for firing the lasers, the signal is inverted to one of the lasers so that the lasers fire sequentially to one another.

9. An agricultural combine as defined by claim 8 wherein each photo detector is provided with a photo detection circuit which also receives the square wave signal from the microprocessor and releases the detection signal to the microprocessor when the opposed laser is fired.

10. A sensor for detecting the volume of particulate matter being transported by a paddle elevator, the sensor comprising:
    a least one laser for emitting laser light;
    at least two photo detectors for receiving the laser light emitted from the laser and emitting a detection signal;
    a protective lens projecting into the paddle elevator and formed of ultra high molecular weight polyethylene, the protective lens protecting the at least one laser and the at least two photo detectors.

11. A sensor as defined by claim 10 wherein the sensor comprises a master unit and a slave unit, the master unit and the slave unit are on opposite sides of the paddle elevator, each unit is provided with a laser and at least two photo detectors, the master unit is provided with a microprocessor for controlling the firing of the lasers and receiving the detection signals and the slave unit is electrically coupled to the master unit.

12. A sensor as defined by claim 11 wherein the microprocessor provides a square wave signal to the lasers for firing the lasers, the signal is inverted to one of the lasers so that the lasers fire sequentially to one another.

13. A sensor as defined by claim 12 wherein each photo detector is provided with a photo detector circuit which also receives the square wave signal from the microprocessor and releases the detected signal to the microprocessor when the opposed laser is fired.

* * * * *